United States Patent
Arias et al.

(10) Patent No.: US 11,611,075 B2
(45) Date of Patent: Mar. 21, 2023

(54) POSITIVE MANGANESE LITHIUM OXIDE-STABILISED ELECTRODE FOR A SECONDARY LITHIUM BATTERY AND A METHOD FOR PRODUCING SAME

(71) Applicant: INSTITUTO TECNOLOGICO DE SANTO DOMINGO, Santo Domingo (DO)

(72) Inventors: Melvin Arias, Santo Domingo (DO); Lorenzo Caputi, Cosenza (IT); Isaias Martinez, Santo Domingo Oeste (DO); Parra Santana, Santo Domingo (DO); Noel Upia, Santo Domingo (DO)

(73) Assignee: INSTITUTO TECNOLOGICO DE SANTO DOMINGO, Santo Domingo (DO)

( * ) Notice: Subject to any disclaimer, the term of this patent is extended or adjusted under 35 U.S.C. 154(b) by 331 days.

(21) Appl. No.: 16/975,177

(22) PCT Filed: Dec. 18, 2018

(86) PCT No.: PCT/DO2018/050003
§ 371 (c)(1),
(2) Date: Aug. 24, 2020

(87) PCT Pub. No.: WO2019/223846
PCT Pub. Date: Nov. 28, 2019

(65) Prior Publication Data
US 2020/0403237 A1    Dec. 24, 2020

(30) Foreign Application Priority Data
May 24, 2018    (DM) .................................. P2018-0132

(51) Int. Cl.
*H01M 4/505*    (2010.01)
*H01M 4/525*    (2010.01)
(Continued)

(52) U.S. Cl.
CPC ........... *H01M 4/505* (2013.01); *H01M 4/525* (2013.01); *H01M 10/0525* (2013.01); *H01M 2004/028* (2013.01)

(58) Field of Classification Search
CPC .. H01M 4/505; H01M 4/525; H01M 10/0525; H01M 2004/028; C01P 2002/54;
(Continued)

(56) References Cited

U.S. PATENT DOCUMENTS 6,022,641 A    2/2000 Endo
6,383,683 B1 *    5/2002 Nagayama ......... C01G 45/1221
429/231.1

(Continued)

*Primary Examiner* — Andrew J. Oyer
(74) *Attorney, Agent, or Firm* — Defillo & Associates, Inc; Evelyn A. Defillo

(57) ABSTRACT

The present invention provides the compound $LiMn_{2-x-y}Na_xM_yO_4/Na_{1-z}MnLi_zM_tO_2/Na_2CO_3$, to be used as a positive electrode for rechargeable lithium ion battery, where M is a metal or metalloid, $0.0 \leq x \leq 0.5$; $0.0 \leq y \leq 0.5$; $0.1 \leq z \leq 0.5$; $0.0 \leq t \leq 0.3$; as well as the method for producing it. The synthesis process includes disolving or mixing the precursor metals and then calcining them in air or controlled atmosphere in a temperature range between 250° C. and 1000° C., and for a time range of 0.5 h to 72 h to obtain the composite proposed with the interaction of its three present phases, presenting a high retention capacity during repeated loading/unloading cycles and excellent discharge capacity both at room temperature and up to 55° C.

12 Claims, 4 Drawing Sheets a       b       c

(51) Int. Cl.
*H01M 10/0525* (2010.01)
*H01M 4/02* (2006.01)

(58) Field of Classification Search
CPC .............. C01P 2004/03; C01P 2004/10; C01P 2004/16; C01P 2004/24; C01P 2002/32; C01P 2002/72; C01P 2002/82; C01P 2006/40; C01G 37/006; C01G 45/1228; C01G 45/1242; C01G 49/0072; C01G 53/42; Y02E 60/10
See application file for complete search history.

(56) References Cited

U.S. PATENT DOCUMENTS

| | | |
|---|---|---|
| 2014/0170492 A1 | 6/2014 | Xia |
| 2016/0013470 A1 | 1/2016 | Umicore |

\* cited by examiner

POSITIVE MANGANESE LITHIUM OXIDE-STABILISED ELECTRODE FOR A SECONDARY LITHIUM BATTERY AND A METHOD FOR PRODUCING SAME

CROSS REFERENCE TO RELATED APPLICATION

This application is a national stage entry of PCT/DO2018/050003 filed Dec. 18, 2018, under the International Convention claiming priority over Dominican Republic Patent Application No. P2018-0132 filed May 24, 2018.

FIELD OF INVENTION

This invention relates to the stabilization of the lithium manganese oxide spinel as a positive electrode for secondary lithium battery and the method for producing the compounds that enables its stabilization. The method basically consists of mixing the precursor compounds of lithium manganese oxide spinel (with the stoichiometric ratio for Li:Mn 1:2, in case of Li:Mn:M doping 1:2-$n_M$:$n_M$; with M=Metal and $n_M$=moles of metal) and with the addition of sodium dissolved in a polymer solution or simply the mixture of the precursor compounds of spinel and sodium carbonate, and then proceed to the baking process in the range of 250 to 1000° C. in an air atmosphere or in an inert atmosphere between 0.5 h to 72 h.

DESCRIPTION OF THE RELATED ART

Lithium manganese oxide spinel is used as a positive electrode for rechargeable lithium ion batteries. The spinel has attractive characteristics such as its abundance, and more economical and environmentally friendly. However, it presents some problems related to the pronounced loss of capacity when increasing the cycles both at room temperature and above 40° C., as well as problems due to the acids that attack the spinel when interacting with the electrolyte.

The different proposed solutions address the structural stabilization of the spinel or its coating by different materials. Patents deal with the replacement of one or more elements of LiMn2O4 spinel by one or more elements of transition, alkaline and alkaline earth metals. As for alkaline and alkaline earth carbonate coatings, U.S. Pat. No. 5,733,685 granted to Wang on March 31st reveals the method of coating with these carbonates after the spinel formation process, in an inert atmosphere from alkaline and alkaline earth hydroxides. On the other hand, U.S. Pat. No. 6,022,641 granted to Endo et al. Feb. 8, 2000 reveals the effect of adding alkaline metal carbonates to the spinel, in quantities ranging from 0.5% to 20% by weight of lithium manganese oxide, improving the capacity stability up to a temperature of 60° C. Finally, the US patent 20140170448 A1 granted to Iwayasu et al. Jun. 19, 2014 reveals the improvement obtained by incorporating an aromatic compound into the electrolyte and also adding a carbon dioxide gas generator from an alkaline or alkaline earth metal carbonate or hydrogen carbonate to the positive electrode.

In general, additional heat treatment is required for the coating of the spinel and the addition of alkaline or alkaline earth carbonates does not address structural problems. It is necessary to provide a method to reduce heat treatments, to protect the spinel from attack by acids and to improve structural stability to maintain a stable high specific discharge capacity over long load-discharge cycles and at a higher than ambient temperature.

DESCRIPTION OF THE INVENTION

The present invention provides stabilized micro and nano particles, fibers, bars and plates of lithium manganese oxide spinel (with inclusion of sodium and other transition metals of the p-block in the structure) and sodium carbonate to be used as positive electrode for secondary battery and method of its production. The method consists of mixing the precursor compounds that allow the formation of the lithium manganese oxide spinel and its doping, adding sodium in the process of initial mixing of the precursors, either as sodium carbonate or in another compound which during the mixing or calcination process facilitates or maintains the formation of sodium carbonate and lithium-sodium manganese oxide as two of the final phases resulting in the formation of active material based on lithium manganese oxide spinel after heat treatment with all precursors in the temperature range of 250 to 1000° C. in air or inert atmosphere or a combination of the two for 0.5 h to 72 h.

The main purpose of this invention is to provide a stable compound based on the interaction of the phases of the lithium manganese oxide, sodium carbonate and lithium sodium manganese oxide spinel to be used as a positive lithium ion rechargeable battery electrode that will eliminate the irreversible loss of capacity and maintain stability in the temperature range of 20 to 55° C.

DETAILED DESCRIPTION OF THE INVENTION

Figure 1:
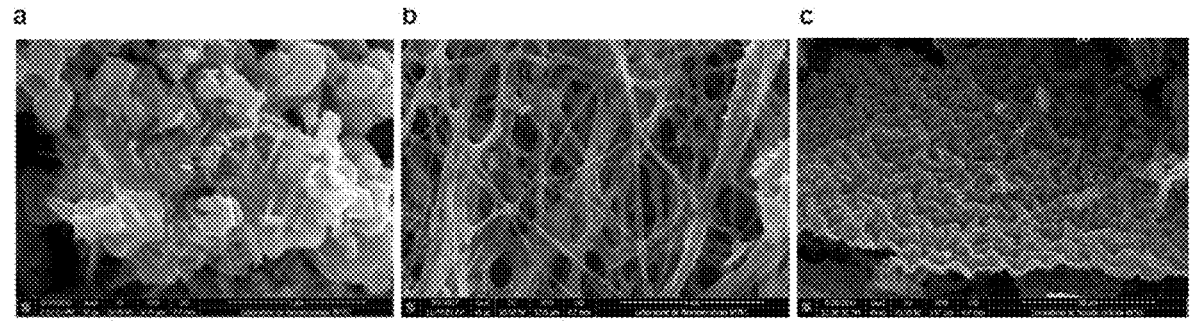
FIG. 1a shows a scanning electron microscope images of nanoparticles and nanobars of LiMn$_{2-x}$Na$_x$O$_4$/Na$_{1-z}$ compound Li$_z$MnO$_2$/Na$_2$CO$_3$, where 0.0≤x≤0.5; 0.1≤z≤0.5.
FIG. 1b shows a scanning electron microscope images of fibres of LiMn$_{2-x}$Na$_x$O$_4$/Na$_{1-z}$ compound Li$_z$MnO$_2$/Na$_2$CO$_3$, where 0.0≤x≤0.5; 0.1≤z≤0.5.
FIG. 1c shows a scanning electron microscope images of porous microplates of LiMn$_{2-x}$Na$_x$O$_4$/Na$_{1-z}$ compound Li$_z$MnO$_2$/Na$_2$CO$_3$, where 0.0≤x≤0.5; 0.1≤z≤0.5.
Figure 2:
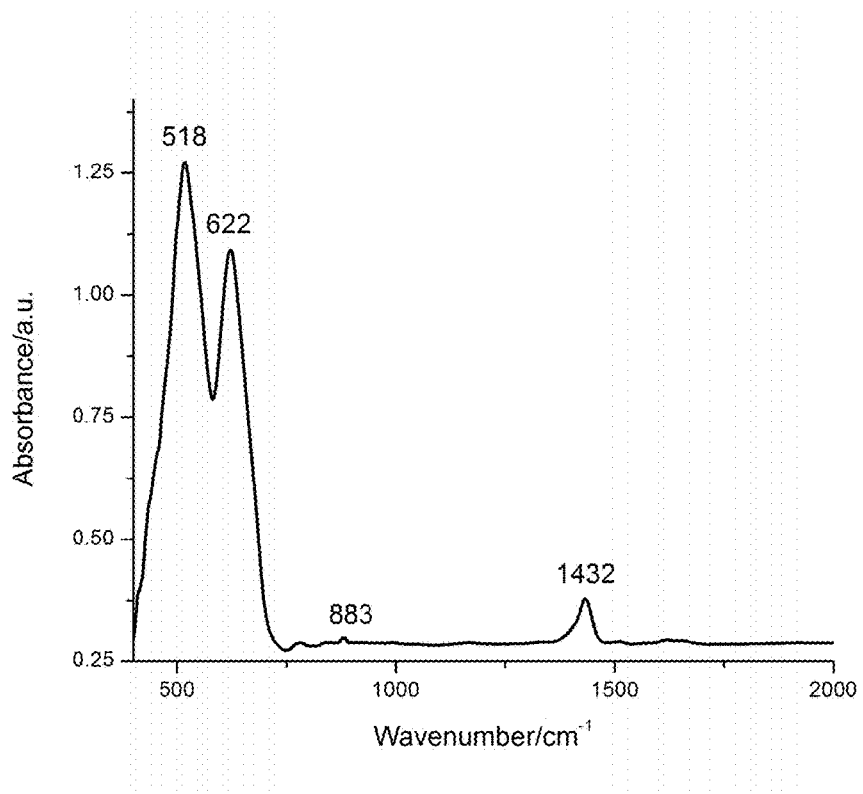
FIG. 2 shows a FT-IR of LiMn$_{2-x}$Na$_x$O$_4$/Na$_{1-z}$ Li$_z$MnO$_2$/Na$_2$CO$_3$ where 0.0≤x≤0.5; 0.1≤z≤0.5 where the peaks around 622 and 518 cm$^{-1}$ are due to the vibrations of Mn—O of the MnO$_6$ group, while 883 and 1432 cm$^{-1}$ indicate the vibrations of Na$_2$CO$_3$.
Figure 3:
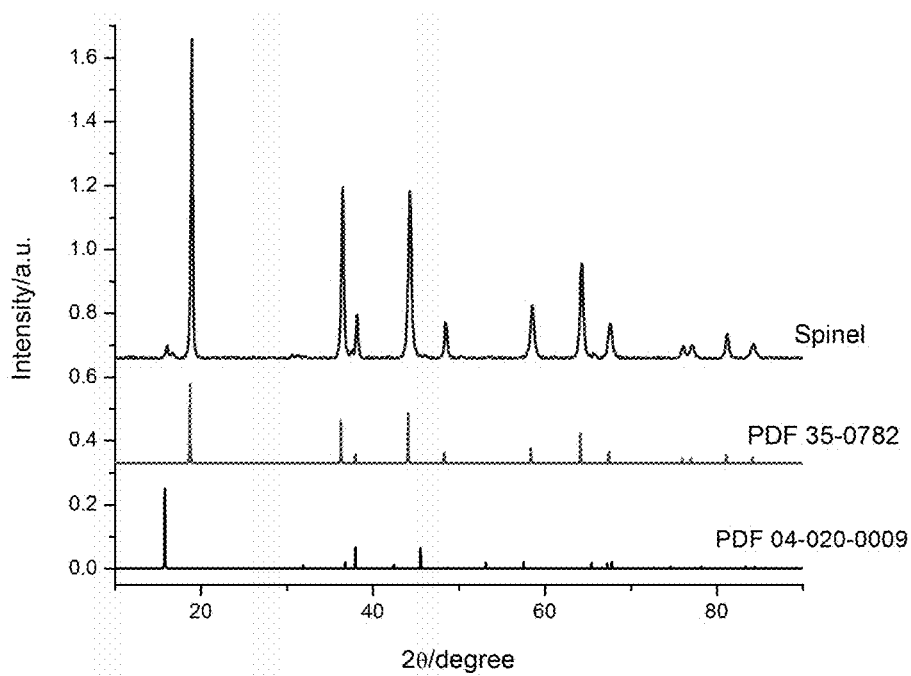
FIG. 3 shows a spectra of the x-ray diffractometry of the LiMn$_{2-x}$Na$_x$O$_4$/Na$_{1-z}$ compound Li$_z$ MnO$_2$/Na$_2$CO$_3$ with 0.0≤x≤0.5; 0.1≤z≤0.5 and the spinel diffraction patterns of lithium manganese oxide and sodium lithium manganese oxide belonging to the space group R3m are identified from the stoichiometric ratio of the precursors of Li:Mn:Na with 1:2:0.2.

This invention provides a method to produce particles and other morphologies (fibers, nanobars, nanobars, nanoneedles, porous nanoplates among others) of the compound formed by three phases that are: lithium manganese oxide with spinel structure ($LiMn_{2-x-y}Na_xM_yO_4$, where $0.0 \leq x \leq 0.5$; $0.0 \leq y \leq 0.5$), sodium manganese oxide-lithium ($Na_{1-z}MLi_zO_2$ where $0.1 \leq z \leq 0.5$) and sodium carbonate ($Na_2CO_3$) obtained from the precursor metals in a polymer solution or by mixing the precursors, and then apply with one or more heat treatments in air or inert atmosphere or in a combination of both in a temperature range of 250° C. to 1000° C., in a time range of 30 min to 72 h.

The precursor compounds of lithium, manganese, sodium, transition metals and metalloids, without limitation, can be: acetates, carbonates, nitrates, metal oxides and hydroxides. Acetates and carbonates are preferred. The molar ratio between lithium (Li), manganese (Mn) and sodium (Na), indicated by Li:Mn:Na, is $1:2:n_{na}$, where $0.01 \leq n_{na} \leq 0.50$.

In the process of forming the positive electrode compound based on lithium oxide manganese spinel for rechargeable lithium battery, a part of the sodium compound decomposes or reacts with the manganese and lithium compounds. Sodium is distributed in the final compound forming sodium carbonate, replacing lithium or manganese atoms in the structure of the lithium manganese oxide spinel and forming sodium lithium manganese oxide belonging to the space group R3m.

In another aspect of this invention, in the process of forming the compound as a positive electrode based on lithium manganese oxide, three phases are obtained in the final product: lithium manganese oxide spinel, sodium lithium manganese oxide and sodium carbonate, interacting with each other. The type of morphology that can form the above-mentioned compounds as material to be used as a positive electrode of secondary lithium-ion battery, without limitation, both at the nano and micro level, are: particles, rods, needles, fibers, porous plates.

In case of doping of the compound based on lithium manganese oxide spinel, the precursor metals when used start from the molar ratio of Li:Mn:Na:M with $1:2-n_M:n_{na}:n_{na}:n_M$ where $0.01 \leq n_{na} \leq 0.5$; $0.0 \leq n_M \leq 0.5$, being M a metal or metalloid preferably Li, Sr, K, Mg, Ni, Cr, Fe, Al, Co, Cu, Ga, In, Ca, Ti, Zn, Si.

EXAMPLE 1

The metal precursors used were lithium acetate dihydrate, manganese (II) acetate tetrahydrate, sodium acetate monohydrate, for the synthesis of $LiMn_{2-x}Na_xO_4/Na_{1-z}MnLi_zO_2/Na_2CO_3$, where $0.0 \leq x \leq 0.5$; $0.1 \leq z \leq 0.5$.

A solution was prepared by mixing in the range of 2 to 20% (% by weight) of PVA, 84.5% (% by weight) of distilled water, and 7.6% (% by weight) of the precursors Li, Mn and Na in a stoichiometric ratio of Li:Mn:Na of 1:2:0.2. The reagents were mixed for 2 hours at 80° C. under stirring they were completely dissolved. The samples obtained were burned first in air for 4 h at 475° C., then grounded in an agate mortar for 45 min and re-burned for 6 h at 700° C. in air. The heating rate was the same in all cases at 4° C./min.

The electrochemical tests were carried out on coin cells of type CR2032 manufactured in a glove box in an argon atmosphere. For the samples, a cathode slurry was prepared by mixing 80% by weight of $LiMn_{2-x}Na_xO_4/Na_{1-z}MnLi_zO_2/Na_2CO_3$ where $0.0 \leq x \leq 0.5$; $0.1 \leq z \leq 0.5$, 10% by weight of Super P Carbon Black and 10% by weight of polyvinylidene fluoride with 1-methyl-2-pyrrolidone and coated with Dr Blade on an aluminium sheet. The samples were vacuum dried at 100° C. overnight and obtained 16 mm diameter discs were used as cathodes. The anode was a lithium metal disc. The electrolyte consisted of LiPF6 1 M in a mixture of ethylene carbonate and dimethyl carbonate (50:50% by volume). Celgard 2400 was used as a separator.

Results are shown in FIGS. 2, 3, 5, 6 and 7.

EXAMPLE 2

The metal precursors used were lithium acetate dihydrate, manganese (II) acetate tetrahydrate, sodium carbonate, for the synthesis of $LiMn_{2-x}Na_xO_4/Na_{1-z}MnLi_zO_2/Na_2CO_3$ where $0.0 \leq x \leq 0.5$; $0.1 \leq z \leq 0.5$.

Figure 4:
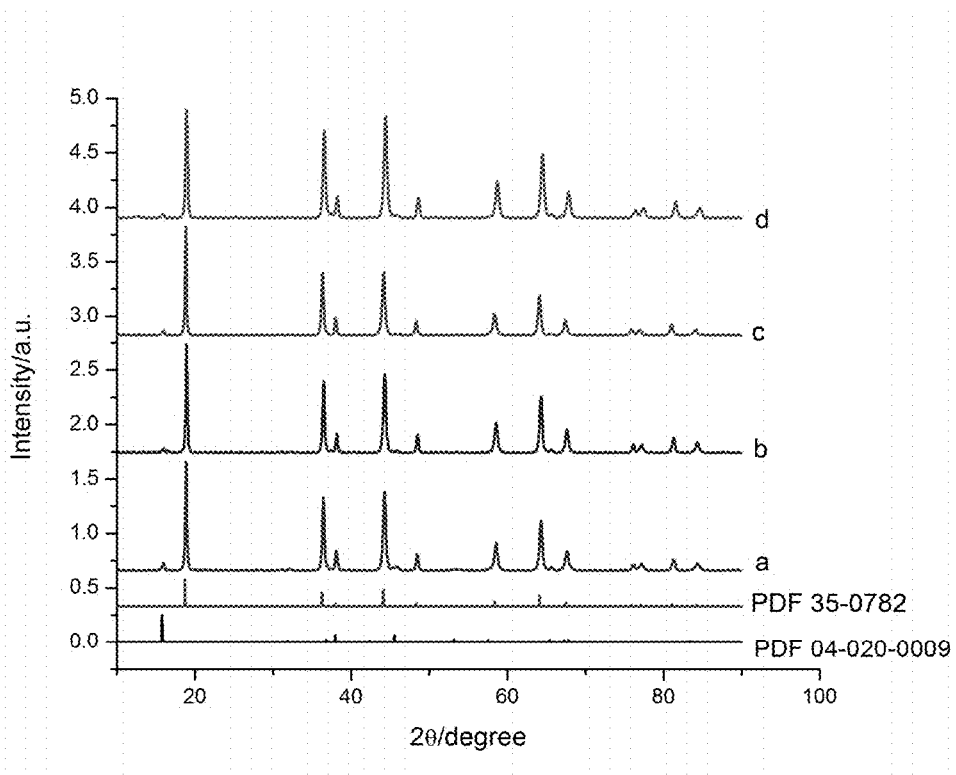
FIG. 4 shows a X-ray diffractometry spectra of LiMn$_{2-x-y}$Na$_x$O$_4$/Na$_{1-z-t}$Li$_z$MnO$_2$/Na$_2$CO$_3$; with 0.0≤x≤0.5; 0.0≤ and ≤0.5; 0.0≤t≤0.3; 0.1≤z≤0.5; where a) M=Al; b) M=Ni; c) M=Fe; d) M=Co; and the spinel diffraction patterns of lithium manganese oxide and sodium-lithium manganese oxide belonging to the space group R3m are identified from the stoichiometric ratio of the Li:Mn:Na:M precursors with 1:2:0.2:0.06.
Figure 5:
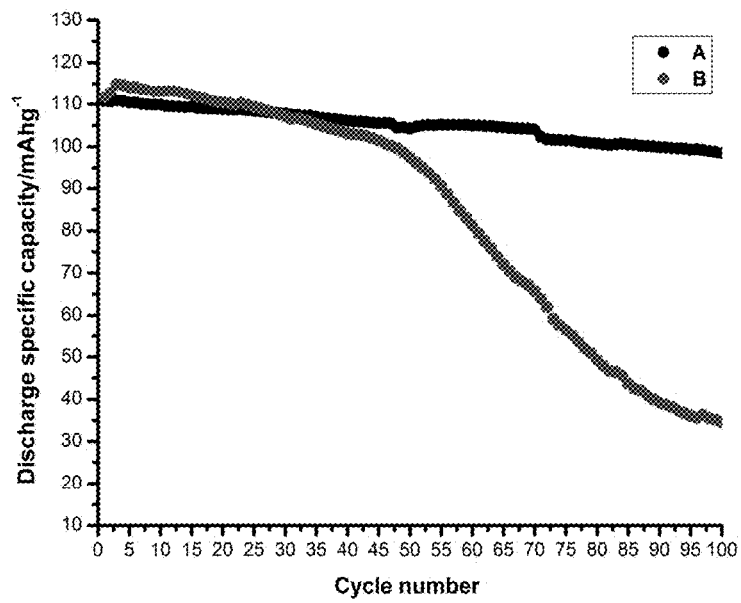
FIG. 5 shows a comparison of the specific discharge capacity at 55° C. of the compound a) LiMn$_{2-x}$Na$_x$O$_4$/Na$_{1-z}$Li$_z$MnO$_2$/Na$_2$CO$_3$ with 0.0≤x≤0.5; 0.1≤z≤0.5 and b) LiMn$_2$O$_4$ obtained by Sol-Gel.
Figure 6:
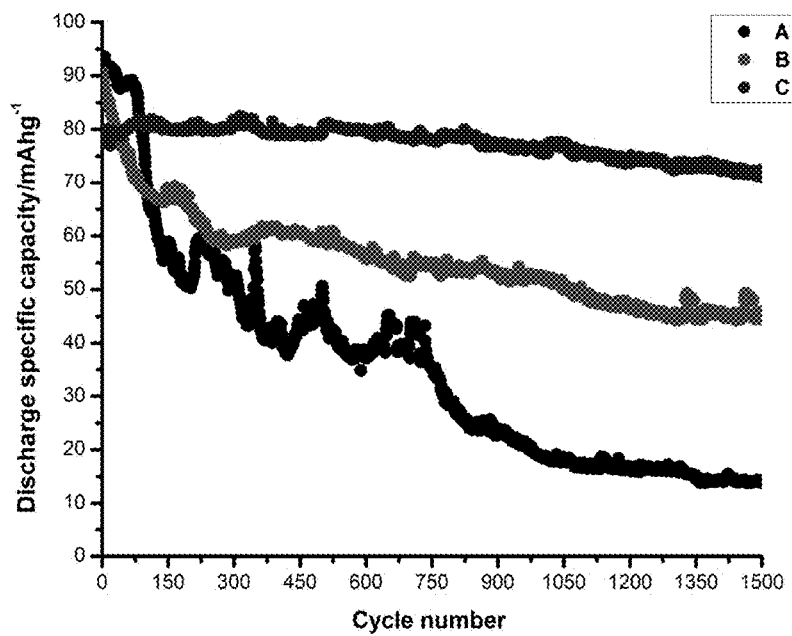
FIG. 6 shows a comparison of the specific discharge capacity at room temperature for 1500 cycles: a) LiMn$_{2-}$ $_xNa_xO_4/Na_{1-z}Li_zMnO_2/Na_2CO_3$ with $0.0 \leq x \leq 0.5$; $0.1 \leq z \leq 0.5$; b) $LiMn_2O_4$ obtained by Sol-Gel; c) $LiMn_2O_4$ obtained by Solid State Reaction.
Figure 7:
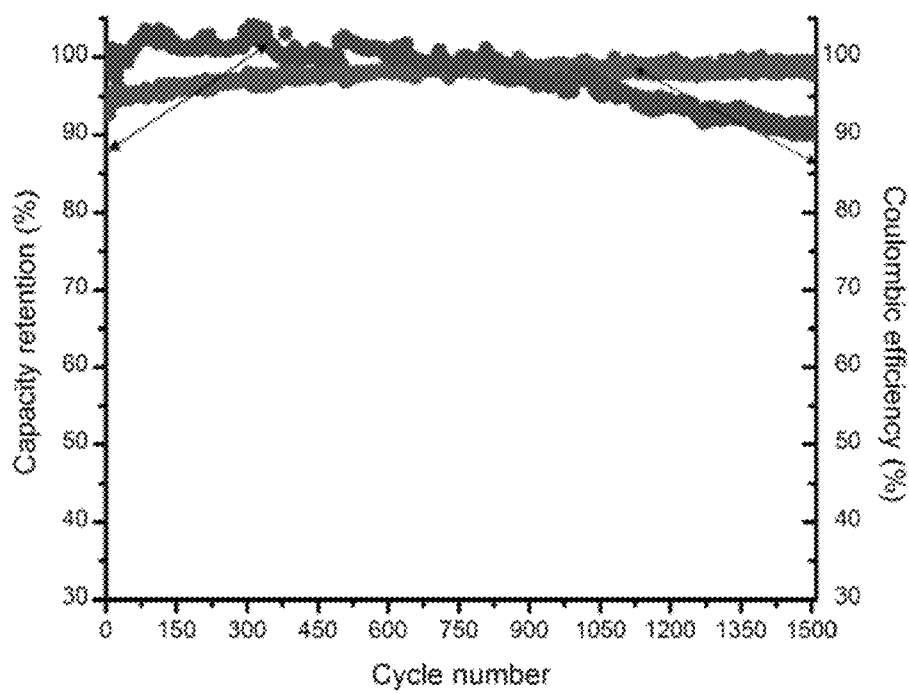
FIG. 7 shows a retention capacity and coulombic efficiency at 1 C=120 mAh/g of $LiMn_{2-x}Na_xO_4/Na_{1-z}Li_zMnO_2/Na_2CO_3$ with $0.0 \leq x \leq 0.5$; $0.1 \leq z \leq 0.5$ at room temperature. Specific capacity at 0.1 C, 0.5 C and 1 C.
Figure 8:
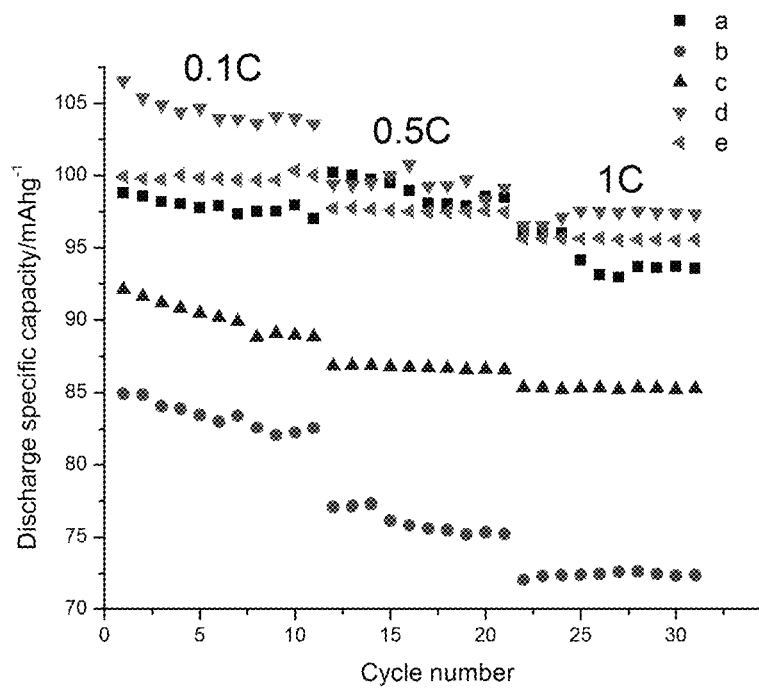
FIG. 8 shows a specific capacity at 0.1 C, 0.5 C and 1 C=120 mAh/g of a) $LiMn_{2-x}Na_xO4/Na_{1-z}Li_zMnO_2/Na_2CO_3$; b) $LiMn_{2-x-z}Na_xO_4/Na_{1-z-t}Li_zMnO_2/Na_2CO_3$; c) $LiMn_{2-x-y}Na_xFe_yO_4/Na_{1-z-t}MnLi_zFe_tO_2/Na_2CO_3$; (d) $LiMn_{2-x-y}Na_xM_yO_4/N_{a1-z-t}MnLi_zM_tO_2/Na_2CO_3$ $LiMn_{2-x-y}Na_xNi_{0.5y}Cr_{0.5y}O_4/N_{a1-z-t}MnLizNi_{0.5t}Cr_{0.5t}O_2/Na_2CO_3$; e) $LiMn_{2-x-y}Na_xCr_yO_4/Na_{1-z-t}MnLi_zCr_tO_2/Na_2CO_3$; where $0.0 \leq x \leq 0.5$; $0.0 \leq y \leq 0.5$; $0.0 \leq t \leq 0.3$; $0.1 \leq z \leq 0.5$; from the stoichiometric ratio of Li:Mn:Na:M precursors with 1:2:0.2:0.06.

The preparation process and the electrochemical tests were carried out using the same procedure as example 1. XRD results and specific capability are shown in FIGS. 4 and 8.

EXAMPLE 3

The metal precursors used were lithium acetate dihydrate, manganese (II) acetate tetrahydrate, sodium carbonate, for the synthesis of LiMn2−xNaxO4/Na1−zMnLizO2/Na2CO3 where $0.0 \leq x \leq 0.5$; $0.1 \leq z \leq 0.5$.

A solution was prepared by mixing distilled water and the precursors Li, Mn and Na in a stoichiometric ratio of Li:Mn:Na of 1:2:0.2. The reagents were mixed for 2 hours at 80° C. under stirring until they were completely dissolved. The samples obtained were burned first in air for 4 h at 475° C., then grounded in an agate mortar for 45 min and re-burned for 6 h at 700° C. in air. The heating rate was the same in all cases at 4° C./min.

Electrochemical tests were carried out using the same procedure as example 1.

EXAMPLE 4

The metal precursors used were lithium acetate dihydrate, manganese (II) acetate tetrahydrate, sodium acetate, for the synthesis of $LiMn_{2-x}Na_xO_4/Na_{1-z}MnLi_zO_2/Na_2CO_3$ where $0.0 \leq x \leq 0.5$; $0.1 \leq z \leq 0.5$.

A solution was prepared by mixing in the range of 2 to 20% (% by weight) of PVA, 84.5% (% by weight) of distilled water, and 7.6% (% by weight) of the precursors Li, Mn and Na in a stoichiometric ratio of Li:Mn:Na of 1:2:0.2. The reagents were mixed for 2 hours at 80° C. under stirring until they were completely dissolved. The samples obtained were burned first in air for 4 h at 475° C., then grounded in an agate mortar for 45 min and re-burned for 6 h at 700° C. in air. The heating rate was the same in all cases at 4° C./min.

Electrochemical tests were carried out using the same procedure as example 1.

EXAMPLE 5

The metal precursors used are lithium acetate dihydrate, manganese (II) acetate tetrahydrate, sodium acetate, for the synthesis of $LiMn_{2-x}Na_xO_4/Na_{1-z}MnLi_zO_2/Na_2CO_3$ where $0.0 \leq x \leq 0.5$; $0.1 \leq z \leq 0.5$.

A solution was prepared by mixing in the range of 2 to 20% (% by weight) of PVA, 84.5% (% by weight) of distilled water, and 7.6% (% by weight) of the precursors Li, Mn and Na in a stoichiometric ratio of Li:Mn:Na of 1:2:0.2. The reagents were mixed for 2 hours at 80° C. under stirring until they were completely dissolved. The samples obtained were burned first in air for 4 h at 475° C., then grounded in an agate mortar for 45 min and re-burned for 6 h at 700° C. in air. The heating rate was the same in all cases at 4° C./min.

Electrochemical tests were carried out using the same procedure as example 1.

EXAMPLE 6

The metal precursors used are lithium acetate dihydrate, manganese (II) acetate tetrahydrate, sodium acetate, nickel acetate for the synthesis of $LiMn_{2-x-y}Na_xNi_yO_4/Na_{1-z-t}MnLi_zNi_tO_2/Na_2CO_3$; where $0.0 \leq x \leq 0.5$; $0.0 \leq y \leq 0.5$; $0.0 \leq t \leq 0.3$; $0.1 \leq z \leq 0.5$.

A solution was prepared by mixing distilled water and the precursors Li, Mn, Na and Ni in a stoichiometric ratio of Li:Mn:Na:Ni of 1:2:0.2:0.06. The reagents were mixed for 2 hours at 80° C. under stirring until they were completely dissolved. The samples were burned in air for a first baking time of 4 h at 475° C., then ground in an agate mortar for 45 min and re-burned for 6 h at 700° C. in air. The heating rate was the same in all cases at 4° C./min.

Electrochemical tests were carried out using the same procedure as example 1.

EXAMPLE 7

The metal precursors used are lithium acetate dihydrate, manganese (II) acetate tetrahydrate, sodium acetate monohydrate, for the synthesis of $LiMn_{2-x}Na_xO4/Na_{1-z}MnLi_zO_2/Na_2CO_3$; where $0.0 \leq x \leq 0.5$; $0.1 \leq z \leq 0.5$.

A solution was prepared by mixing in the range of 8.4% (% by weight) of PVA, 84.5% (% by weight) of distilled water, and 7.6% (% by weight) of the precursors Li, Mn and Na in a stoichiometric ratio of Li:Mn:Na of 1:2:0.2. The reagents were mixed for 2 hours at 80° C. under stirring until they were completely dissolved. To obtain the fibres by electrospinning a 1 ml syringe with a 0.4 mm needle filled with the prepared solution was used and placed in a horizontal syringe pump. The solution was injected at a rate of 0.8 ml/h while a 26 kV field was applied between the needle and a grounded manifold at a distance of 15 cm. The fibres obtained were burned in air in a first baking oven for 4 h at 475° C., then re-burned for 6 h at 700° C. in air. The heating rate was the same in all cases at 4° C./min.

Electrochemical tests were carried out using the same procedure as example 1.

The invention claimed is:

1. A method for producing a positive manganese lithium oxide stabilized electrode for a secondary lithium battery, the method comprising the steps of:

producing a three phase compound including lithium manganese oxide with spinel structure ($LiMn_{2-x-y}Na_xM_yO_4$, and for $0.0 \leq x \leq 0.5$; $0.0 \leq y \leq 0.5$), sodium manganese oxide—lithium ($Na_{1-z-t}MnLi_zMtO_2$, where $0.1 \leq z \leq 0.5$; $0.0 \leq t \leq 0.3$), and sodium carbonate ($Na2CO3$);

wherein M is a metal selected from the group consisting of Li, Sr, Mg, Ni, Cr, Fe, Al, Co, Cu, Ga, In, Ca, Ti, Zn, and Si;

wherein a molar ratio between lithium (Li), manganese (Mn), sodium (Na), which is indicated by Li:Mn:Na:M; in the ratio of 1:2-nM: nna:nM;

wherein $0.01 \leq nna \leq 0.5$; $0.0 \leq nM \leq 0.5$, in a polymer solution or a mixture of the precursors and then subjected to a heat treatment of 250° C. to 1000° C. in an air or inert atmosphere or a combination of both.

2. The method according to claim 1, wherein the compound is a powder.

3. The method according to claim 1, wherein the compound is a micro and nano fibers, rods, needles, or composite porous plates.

4. A positive manganese lithium oxide stabilized electrode for a secondary lithium battery comprising a compound including $LiMn_{2-x-y}Na_xM_yO_4/Na_{1-z}MnLi_zM_tO_2/Na_2CO_3$, wherein $0.0 \leq x \leq 0.5$; $0.0 \leq y \leq 0.5$; $0.1 \leq z \leq 0.5$; $0.0 \leq t \leq 0.3$; and M is selected from the group consisting of Li, Sr, Mg, Ni, Cr, Fe, Al, Co, Cu, Ga, In, Ca, Ti, and Zn.

5. The positive manganese lithium oxide stabilized electrode according to claim 4, wherein the compound is micro and nano fibers of the active material stabilized to be used as positive electrode in rechargeable lithium-ion batteries, and comprises $LiMn_{2-x-y}Na_xM_yO_4/Na_{1-z}MnLi_zM_tO_2/Na_2CO_3$ where $0.0 \leq x \leq 0.5$; $0.0 \leq y \leq 0.5$; $0.1 \leq z \leq 0.5$; $0.0 \leq t \leq 0.3$, and M is selected from the group consisting of Li, Sr, Mg, Ni, Cr, Fe, Al, Co, Cu, Ga, In, Ca, Ti, and Zn.

6. The positive manganese lithium oxide stabilized electrode according to claim 4, wherein the compound is nano bars of the active material stabilized to be used as positive electrode in rechargeable lithium-ion batteries comprises $LiMn_{2-x-y}Na_xM_yO_4/Na_{1-z}MnLi_zM_tO_2/Na_2CO_3$; where $0.0 \leq x \leq 0.5$; $0.0 \leq y \leq 0.5$; $0.1 \leq z \leq 0.5$; $0.0 \leq t \leq 0.3$; and M is selected from the group consisting of Li, Sr, Mg, Ni, Cr, Fe, Al, Co, Cu, Ga, In, Ca, Ti, and Zn.

7. The positive manganese lithium oxide stabilized electrode according to claim 4, wherein the compound is micro and nano needles of the active material stabilized to be used as positive electrode in rechargeable lithium-ion batteries and comprises $LiMn_{2-x-y}Na_xM_yO_4/Na_{1-z}MnLi_zM_tO_2/Na_2CO_3$; where $0.0 \leq x \leq 0.5$; $0.0 \leq y \leq 0.5$; $0.1 \leq z \leq 0.5$; $0.0 \leq t \leq 0.3$; and M is selected from the group consisting of Li, Sr, Mg, Ni, Cr, Fe, Al, Co, Cu, Ga, In, Ca, Ti, and Zn.

8. The positive manganese lithium oxide stabilized electrode according to claim 4, wherein the compound is porous micro and nano plates of the active material stabilized to be used as positive electrode in rechargeable lithium-ion batteries and comprises $LiMn_{2-x-y}Na_xM_yO_4/Na_{1-z}MnLi_zM_tO_2/Na_2CO_3$; where $0.0 \leq x \leq 0.5$; $0.0 \leq y \leq 0.5$; $0.1 \leq z \leq 0.5$; $0.0 \leq t \leq 0.3$; and M is selected from the group consisting of Li, Sr, Mg, Ni, Cr, Fe, Al, Co, Cu, Ga, In, Ca, Ti, and Zn.

9. A method for the production of a positive manganese lithium oxide stabilized electrode for a secondary lithium battery, the method comprising the steps of:

producing a three phase compound including lithium manganese oxide with spinel structure ($LiMn_{2-x-y}Na_xM_yO_4$, where M is a metal, and for $0.0 \leq x 0.5$; $0.0 \leq y \leq 0.5$), sodium manganese oxide lithium ($Na_{1-z-t}MnLi_zM_tO_2$, where $0.1 \leq z \leq 0.5$; $0.0 \leq t \leq 0.3$), and sodium carbonate ($Na_2CO_3$);

wherein the lithium manganese oxide, the sodium manganese oxide lithium, and the $Na_2CO_3$ are mixed and heated in a range between 200° C. to 700° C. in a time range of 0.1 h to 20 h in an air atmosphere.

10. The method according to claim 9, wherein the compound is a powder of the stabilized active material to be used as a positive electrode in rechargeable lithium-ion batteries and comprises $LiMn_{2-x-y}Na_xM_yO_4/Na_{1-z}MnLi_zM_tO_2/Na_2CO_3$; where $0.0 \leq x \leq 0.5$; $0.0 \leq y \leq 0.5$; $0.1 \leq z \leq 0.5$; $0.0t \leq 0.3$.

11. The method according to claim 9, wherein the compound is nano bars of the stabilized active material to be used as a positive electrode in rechargeable lithium-ion batteries and comprises $LiMn_{2-x-y}Na_xM_yO_4/Na_{1-z}MnLi_zM_tO_2/Na_2CO_3$; where $0.0 \leq x \leq 0.5$; $0.0 \leq y \leq 0.5$; $0.1 \leq z \leq 0.5$; $0.0t \leq 0.3$.

12. The method according to claim 9, wherein the compound are micro and nano particles, fibers, bars, needles, porous plates of the stabilized active material to be used as a positive electrode in rechargeable lithium-ion batteries and comprises $LiMn_{2-x-y}Na_xM_yO_4/Na_{1-z}MnLi_zM_tO_2/Na_2CO_3$; where $0.0 \leq x \leq 0.5$; $0.0 \leq y \leq 0.5$; $0.1 \leq z \leq 0.5$; $0.0t \leq 0.3$.

* * * * *